United States Patent Office 3,557,226
Patented Jan. 19, 1971

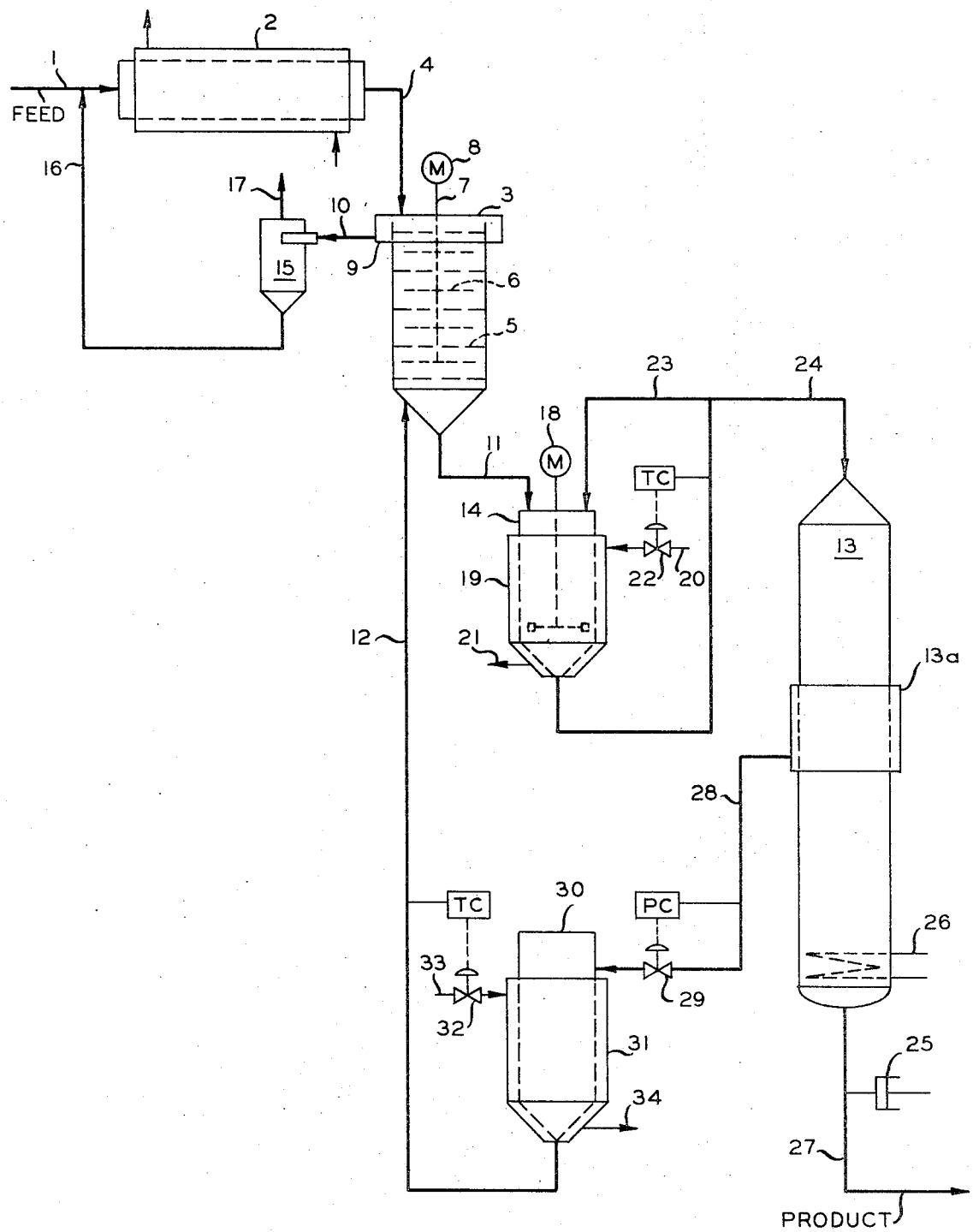

3,557,226
CRYSTAL SEPARATION AND PURIFICATION
Fred T. Sherk, Bartlesville, Okla., assignor to Phillips Petroleum Company, a corporation of Delaware
Filed Apr. 7, 1967, Ser. No. 629,214
Int. Cl. C07c 7/14
U.S. Cl. 260—674                                    6 Claims

ABSTRACT OF THE DISCLOSURE

A multi-component fluid stream is partially frozen and passed to an agitated multi-stage solids conditioner wherein it is contacted with a mother liquor stream from, for example, a crystal purification column. A resulting conditioned crystal slurry can then be passed from the solids conditioner to a crystal purification zone as feed.

This invention relates to separation by crystallization. In another aspect, this invention relates to an improved method and apparatus for the separation of a plurality of fluids by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation for systems which exhibit the eutectic type of solid-liquid equilibria. Therefore, distillation and extraction theoretically require infinite stages for a pure product whereas crystallization, in many cases, requires only one.

A method of separating a pure component from a mixture has been devised whereby the mixture to be separated is introduced into the heat exchanger zone wherein a slurry of crystals is formed and that slurry of crystals is then introduced into an elongated purification chamber through which the crystals are removed as a compact mass. As disclosed by J. Schmidt, Re. 23,810 and Thomas, U.S. 2,854,494, as mass of crystals is then moved through a melting zone wherein the crystals are melted. A portion of liquid corresponding to the melt is caused to move countercurrently through at least a portion of the crystal mass so as to displace the occluded impurities from the crystal mass approaching the melting zone. A high yield of product is obtained since the high melting product refreezes from the reflux stream as it comes in contact with the cold mass moving toward the melting zone. Thus, the portion of the crystal mass which approaches the melting zone does not contain any appreciable amount of impurities and the resulting product which is removed from the melting zone is of an extremely high purity. The impurities are withdrawn in a stream of mother liquor from an intermediate portion of the crystal purification zone.

Recently, it has been found that the product purity from the crystal purification zones described above can be much higher and the purification zone itself can be operated more efficiently if the crystals in the feed slurry entering the zone are relatively large in size and maintained at a temperature considerably above the temperature to which the feed is cooled in the initial crystal forming step. Various methods have been devised in an attempt to condition the crystals in the feed slurry passed to the crystal purification zone to thereby increase the efficiency thereof as stated above. These methods include treating the initial crystal slurry by the following processes or by combinations of the following processes: filtering, heating and re-slurrying and/or refreezing. While the filtering, heating and re-slurrying processes can generally remove the smaller crystals from the feed slurry, they are generalsy ineffective to cause increased growth of the larger crystals. The refreezing operation generally results in the formation of more smaller unwanted crystals. Also, these processes result in relatively high operation costs and one pass product yields less than optimum. Therefore, there is needed an effective process and apparatus therefor which will yield a desired crystal slurry feed containing a large portion of larger size crystals maintained at a desired crystal purification temperature, and that requires relatively small operating energy inputs.

According to one embodiment of this invention, a multi-component fluid stream is cooled so that at least a major portion of at least one of the components therein is crystallized to form a first crystal slurry which is passed to an agitated multi-stage solids conditioning zone wherein it is contacted with a first mother liquor stream. Preferably, this mother liquor stream contains a greater concentration in the liquid phase of the crystallized component or components in the first slurry than the liquid portion of the first slurry contains. The larger crystals within the first slurry gravitate through the solids conditioning zone and grow to a larger size as more of the warm mother liquor is contacted and frozen thereto. A portion of the smaller crystals melt and refreeze to the larger crystals, and another portion of the smaller crystals pass out of the solids conditioning zone with a resulting second mother liquor stream. The first mother liquor stream not only warms the crystals in the first slurry but supplies material for crystal growth. Larger crystals which gravitate through the solids conditioning zone are then removed therefrom in a second crystal slurry generally having a greater solids concentration than the said first crystal slurry. This second crystal slurry is next passed as feed to a conventional crystal purification zone. Preferably, the mother liquor passed to the solids conditioning zone is removed as by-product from the said crystal purification zone. Also, if desired, the second crystal slurry can be additionally heated before it is passed into the crystal purification zone.

According to another embodiment of this invention, the mother liquor containing smaller crystals which is withdrawn from the solids conditioning zone is passed to a fluid-solids separation zone. The resulting crystals removed by the fluid-solids separation zone are then passed to the multi-component feed prior to the cooling step.

A more complete understanding of this invention can be obtained by reference to the following description and drawing which is a schematic illustration of a preferred embodiment of this invention.

Now referring to the drawing, a multi-component feed mixture enters conduit 1 and flows through chiller 2. Chiller 2 can be any conventional type chiller, preferably being of the scraped surface type, which is supplied with refrigeration means that are adequate to lower the temperature of the liquid mixture to that necessary to crystallize at least a major portion of at least one of the components thereof to form a first crystal slurry. The first crystal slurry then passes to the upper region of multistage solids conditioner 3 via conduit 4. Solids conditioner 3 comprises an elongated vessel with a generally conical bottom having a series of annular trays 5 affixed along the interior circumference thereof and movable trays 6 mounted on spindle 7 which, in turn, is concentrically and rotatably mounted therein. The rotation of spindle 7 is controlled by motor 8. Overflow trough 9 is positioned at the top of solids conditioner 3, and has conduit 10 communicating therewith. Conduit 11 adapted to carry a crystal slurry connects with the bottom of solids conditioner 3, and fluid conduit 12 connects to the lower region of conditioner 3.

As illustrated, the first crystal slurry from chiller 2 is deposited in the upper region of solids conditioner 3. Warmed mother liquor from crystal purification zone 13 is supplied to the lower region of solids conditioner 3 via conduit 12. Motor 8 turns spindle 7 from 1 to 100 r.p.m. to thereby maintain an agitated motion within the interior of conditioner 3. The mother liquor is generally very rich in the component or components to be crystallized. As the crystals within the first crystal slurry gravitate from tray to tray in contact with the mother liquor, the smaller crystals will either melt or be carried to the top of solids conditioner 3 with the mother liquor. The larger crystals will grow as they contact the rich mother liquor and gravitate to the bottom of solids conditioner 3. In addition, the larger crystals gravitating to the bottom of solids conditioner 3 will be warmed appreciably by the upward flowing mother liquor.

The length and diameter of vessel 3 and the number of trays within vessel 3 will vary according to feed concentrations, volumes, flows rates, etc. These factors are varied to allow sufficient contact between the cold crystal slurry and the warm mother liquor and to provide sufficient residence time for the growing crystals. Also, in some operations, it may be desirable to introduce the crystal slurry at the bottom or intermediate portions of vessel 3 and the mother liquor at the top or intermediate portions of vessel 3.

A second crystal slurry preferably having a solids content higher than the first crystal slurry will be removed from solids conditioner 3 and passed to surge tank 14 via conduit 11. A lean mother liquor stream containing a small portion of crystals is removed from trough 9 and passed to filter or cyclone 15 via conduit 10. Crystals are removed from this mother liquor stream by filter 15 and passed to feedstream 1 via conduit 16 and mother liquor product is withdrawn from filter 15 via conduit 17. Filter 15 can be any fluid solids separation means known in the art such as a cyclone, centrifuge, or filter device; however, if mother liquor stream flowing through conduit 10 contains relatively no crystals at all or a very small portion of crystals, it may not be desired in some instances to utilize filter 15. Therefore, the use of filter 15 is not intended to limit the scope of this invention. Thus, as apparent from the above discussion, the solids conditioner 3 serves to concentrate the crystal slurry feed, to grow larger crystals by bringing the crystals from the first crystal slurry into contact with a rich mother liquor stream and giving them residence time to thereby grow, to classify the crystals, i.e., remove the smaller crystals and the bulk of the mother liquor from the larger crystals, and to warm the crystals being passed to crystal purification column 13.

Surge tank 14 can be agitated by a means such as motor-driven stirrer 18 and warmed by heat exchanger fluid passing through jacket 19 as illustrated in the drawing. Conduit 20 introduces a heat exchanger fluid such as the feed stream in conduit 1 into jacket 19 and conduit 21 removes this heat exchange fluid therefrom. As illustrated, the flow of the heat exchange fluid can be controlled by valve 22 in response to the temperature of the crystal slurry in conduit 23. It must be understood that the heat exchange operation within search tank 14 is not intended to limit the scope of this invention, but is included in this preferred embodiment as a means to adjust the temperature of the second slurry to the exact desired level before introduction thereof into the crystal purification column 13. The recycle to slurry tank 14 via conduit 23 is not intended to limit the scope of this invention. Thus, the second crystal slurry passes from conduit 23 to conduit 24 and into crystal purification column 13. The crystals from the second slurry are moved through crystal purification column 13 as a compact mass by the action of piston 25. The workings of crystal purification column 13 are more adequately described in U.S. Pat. 2,854,494. Heater 26 melts a portion of the crystals of the mass in the lower portion of column 13, and the resulting melt is refluxed to the crystal mass where it displaces occluded impurities therefrom. This displaced mother liquor is collected by collection means 13a adjacent a liquid permeable wall section in column 13. The melt product is removed from column 13 via conduit 27, and the displaced mother liquor is withdrawn from column 13 via conduit 28 in response to the opening of valve 29 which is manipulated by a pressure controller connected to conduit 28, and then introduced into surge tank 30. Surge tank 30 can be warmed by the action of the heat exchange fluid flowing through jacket 31, the amount of heat exchange fluid being controlled by valve 32 in response to the temperature of the mother liquor in conduit 12. If desired, the melt product flowing through conduit 27 can be introduced into conduit 33 as the heat exchange medium and removed from jacket 31 via conduit 34 as illustrated in the drawing.

The following example is given to better illustrate this invention and is not intended to limit the scope thereof.

EXAMPLE

The following Table I illustrates the separation of paraxylene from ethylbenzene and mixed xylenes by the process and apparatus of this invention.

The data is typical of a process carried out with the apparatus of the figure. It is noted that solids conditioning vessel 3 is an elongated vessel 10 feet wide and 20 feet in height. There are 8 annular plates 5 spaced 2 feet apart along the length thereof. The diameter of each annular space is 1 foot. Spindle 7 carries 8 movable baffles spaced 2 feet apart and between annular plates 5. Movable baffles 6 are 8 feet in diameter. Spindle 7 turns at 2 r.p.m.

TABLE I

| | Stream in conduit | Ethyl benzene (lb./hr.) | Metal benzene (lb./hr.) | Para benzene (lb./hr.) | Ortho benzene (lb./hr.) | Total (lb./hr.) | Percent solids | Temp. (° F.) |
|---|---|---|---|---|---|---|---|---|
| Feed No./hr | 1 | 13,504 | 32,474 | 14,374 | 8,705 | 69,057 | | |
| Recycle solids | 16 | 1,350 | 3,248 | 1,437 | 871 | 6,906 | 14 | −94 |
| Thickener feed | 4 | 14,854 | 35,722 | 15,811 | 9,576 | 75,963 | 14 | −95 |
| Thickener overflow | 10 | 14,842 | 35,693 | 6,066 | 9,568 | 66,169 | 1.5 | −94 |
| Mother liquor product | 17 | 13,492 | 32,445 | 4,629 | 8,697 | 59,263 | | −94 |
| Thickener underflow | 11 | 3,380 | 8,150 | 25,490 | 2,180 | 39,200 | 35 | 5 |
| Column feed | 24 | 3,380 | 8,150 | 25,490 | 2,180 | 39,200 | 25 | 14 |
| Column mother liquor | 28 | 3,368 | 8,121 | 15,745 | 2,172 | 29,406 | | 14 |
| | 12 | 3,368 | 8,121 | 15,745 | 2,172 | 29,406 | | 45 |
| Paraxylene product No./hr | 27 | 12 | 29 | 9,745 | 8 | 9,794 | | 95 |

As illustrated, 68 weight percent of the para-xylene from the feedstream through conduit 1 is recovered as product from conduit 27. The first crystal slurry passed to solids conditioners 3 via conduit 4 contains 14 percent solids and is maintained at −95° F., and the second crystal slurry removed from solids conditioner 3 via conduit 11 contains 35 percent solids and is maintained at 5° F. Thus, as illustrated, the use of solids conditioner 3 will result in a very efficient operation of crystal purification column 13 with a minimum of operating cost.

The above example is not intended to limit the scope of this invention. The method and apparatus of this invention can be advantageously utilized in practically any system to which fractional crystallization is applicable. For example, this invention can be utilized to purify naphthalene, hydroquinone (1,4-benzenedynel), para-cresol, para-dichlorobenzene, high melting waxes, fatty acids, and high molecular weight normal paraffins.

I claim:

1. A process for separation and purification of at least one of the components in a fluid mixture comprising the steps of:
   (a) cooling said mixture in a cooling zone sufficient to cause a portion thereof to crystallize and thereby form a first crystal slurry;
   (b) passing said first crystal slurry to an agitated multi-stage solids conditioning zone wherein said first crystal slurry is contacted with a hereafter formed first mother liquor stream to thereby form a second crystal slurry and a second mother liquor stream;
   (c) passing said second crystal slurry from said solids conditioning zone to a crystal purification zone wherein the crystalline portion of said second slurry is counter-currently contacted with melt resulting from the heating of said second crystal slurry and thereby displacing mother liquor from the crystals;
   (d) withdrawing a portion of said melt as product of the process; and
   (e) withdrawing said displaced mother liquor from said crystal purification zone, said withdrawn displaced mother liquor constituting said first mother liquor stream, and passing said first mother liquor stream to said solids conditioning zone.

2. Process of claim 1 further comprising passing said second mother liquor stream through a fluid solid separation zone to thereby remove solids therefrom, and passing these solids to said fluid mixture entering said cooling zone.

3. Process of claim 2 further comprising:
   (a) passing said second crystal slurry through a heating and mixing zone and then to said crystal purification zone; and
   (b) passing said first mother liquor stream through a heating zone before passing it to said solids conditioning zone.

4. A process, as set forth in claim 1, wherein the component to be separated from the fluid mixture is para-xylene.

5. A process, as set forth in claim 1, wherein the component to be separated from the fluid mixture is naphthalene.

6. A process, as set forth in claim 1, wherein the component to be separated from the fluid mixture is para-cresol.

References Cited

UNITED STATES PATENTS

| | | | |
|---|---|---|---|
| 2,780,663 | 2/1957 | Gunness | 260—674 |
| 2,813,099 | 11/1957 | Weedman | 260—674X |
| 3,410,923 | 11/1968 | Strand et al. | 260—674 |
| 3,103,541 | 9/1963 | Smith et al. | 260—674 |

CURTIS R. DAVIS, Primary Examiner

U.S. Cl. X.R.

260—428, 590, 651, 676